United States Patent [19]

Sudan

[11] 4,290,848
[45] Sep. 22, 1981

[54] ION-RING IGNITOR FOR INERTIAL FUSION

[75] Inventor: Ravindra N. Sudan, Ithaca, N.Y.

[73] Assignee: Cornell Research Foundation, Inc., Ithaca, N.Y.

[21] Appl. No.: 936,959

[22] Filed: Aug. 25, 1978

[51] Int. Cl.$^3$ .............................................. G21B 1/00
[52] U.S. Cl. ...................................................... 176/5
[58] Field of Search ............................... 176/1, 2, 3, 4

[56] References Cited

U.S. PATENT DOCUMENTS

| | | | |
|---|---|---|---|
| 3,039,014 | 6/1962 | Chang | 176/4 |
| 3,047,480 | 7/1962 | Lovberg et al. | 176/3 |
| 3,096,269 | 7/1963 | Halbach et al. | 176/2 |
| 4,129,772 | 12/1978 | Navratil et al. | 176/2 |

OTHER PUBLICATIONS

Nuclear Fusion (15) 1975, pp. 1143-1155, Fleischmann et al.
Phys. Rev. Let., vol. 171, No. 1, (10/68) p. 212, Winterberg.
Phy. Rev. Let., vol. 35, No. 13 (9/29/75), pp. 848-850, Clauser.
3rd Conf. on Pulsed High Beta Plasmas (9/75) pp. 477-481, Robson et al.
Heavy Ion Accelerators and Storage Rings for Pellet Fusion Reactors (2/9/76) Martin et al., pp. 1-16.
Plasma Physics, vol. 19, pp. 1101-1117, (1977) Friedman et al.
J. Appl. Phys., vol. 47, No. 6 (6/76) pp. 2382-2390, Humphries et al.
Phys. Rev. Let., vol. 33, No. 6, (8/74) pp. 355-358, Sudan et al.
Phys. of Fluids, vol. 20, No. 7, (7/77) pp. 1195-1199, Weibel.
Bull. A.P.S. vol. 22, No. 9 (10/77) pp. 1069-1070, Dreike et al.
Phy. Rev. Let., vol. 31, No. 19 (11/73) pp. 1174-1177, Sudan et al.
J. App. Phys., vol. 48, No. 7 (7/77) Humphries et al., pp. 2738-2752.
LA-5718-MS, 9/74, William et al. pp. 1-22.
6th Sym. Eng. Prob. Fus. Res., San Diego, Ca. (11/75) Bard et al., pp. 1-5.

*Primary Examiner*—S. A. Cangialosi
*Attorney, Agent, or Firm*—Jones, Tullar & Cooper

[57] ABSTRACT

Apparatus is disclosed for inertial fusion in which a pulse of ions is injected into a magnetic mirror where the ions are trapped in the form of an ion ring which is then magnetically compressed to increase its energy and reduce its dimensions. The compressed ion ring is then accelerated through a guide tube to strike a pellet in a thermonuclear fusion reactor.

14 Claims, 1 Drawing Figure

ION-RING IGNITOR FOR INERTIAL FUSION

BACKGROUND OF THE INVENTION

Several techniques have been proposed for producing high powered energy and delivering that energy as an "ignitor" to a fusion pellet. For example, Nuckolls, et al:

J. Nuckolls, L. Wood, A. Thiessen, and G. Zimmerman, Nature (Lond.) 239, 139 (1972)

proposed the use of lasers; others proposed use of relativistic electrons beams:

F. Winterberg, Phys. Rev. 174, 212 (1968); L. I. Rudakov and A. Samarsky, Proc. Sixth European Conf. on Cont. Fusion and Plasma Phys., Moscow, USSR, 1973, Vol. I., p. 487; G. Yonas et al., ibid., Vol. I, p. 783.

Others have proposed the use of intense beams of light ions in the 10 MeV range:

M. J. Clauser, Phys. Rev. Lett. 35, 848 (1975); J. W. Shearer, Nucl. Fus. 15, 952 (1975); S. Sumphries, R. N. Sudan, and L. Wiley, J. Appl. Phys. 47, 2382 (1976).

and still others have proposed 25–100 GeV heavy ion beams:

A. W. Maschke, IEEE Trans. Nucl. Sci. 22, 1825 (1975); R. L. Martin and R. C. Arnold, in Proc. Conf. on Heavy Ion Accelerators and Storage Rings for Pellet Fusion Reactors, Argonne National Laboratory, Argonne, Illinois, March 1976 (unpublished) and Proc. Heavy Ion Fusion Workshop, Brookhaven Laboratory, Upton, NY, Oct. 1977.

SUMMARY OF THE INVENTION

A pulse of ions is injected into a magnetic mirror where they are trapped to form an ion ring. The ion ring, is then compressed to increase its energy and then accelerated to impact a fusion pellet in a reaction chamber.

DETAILED DESCRIPTION

Figure 1:
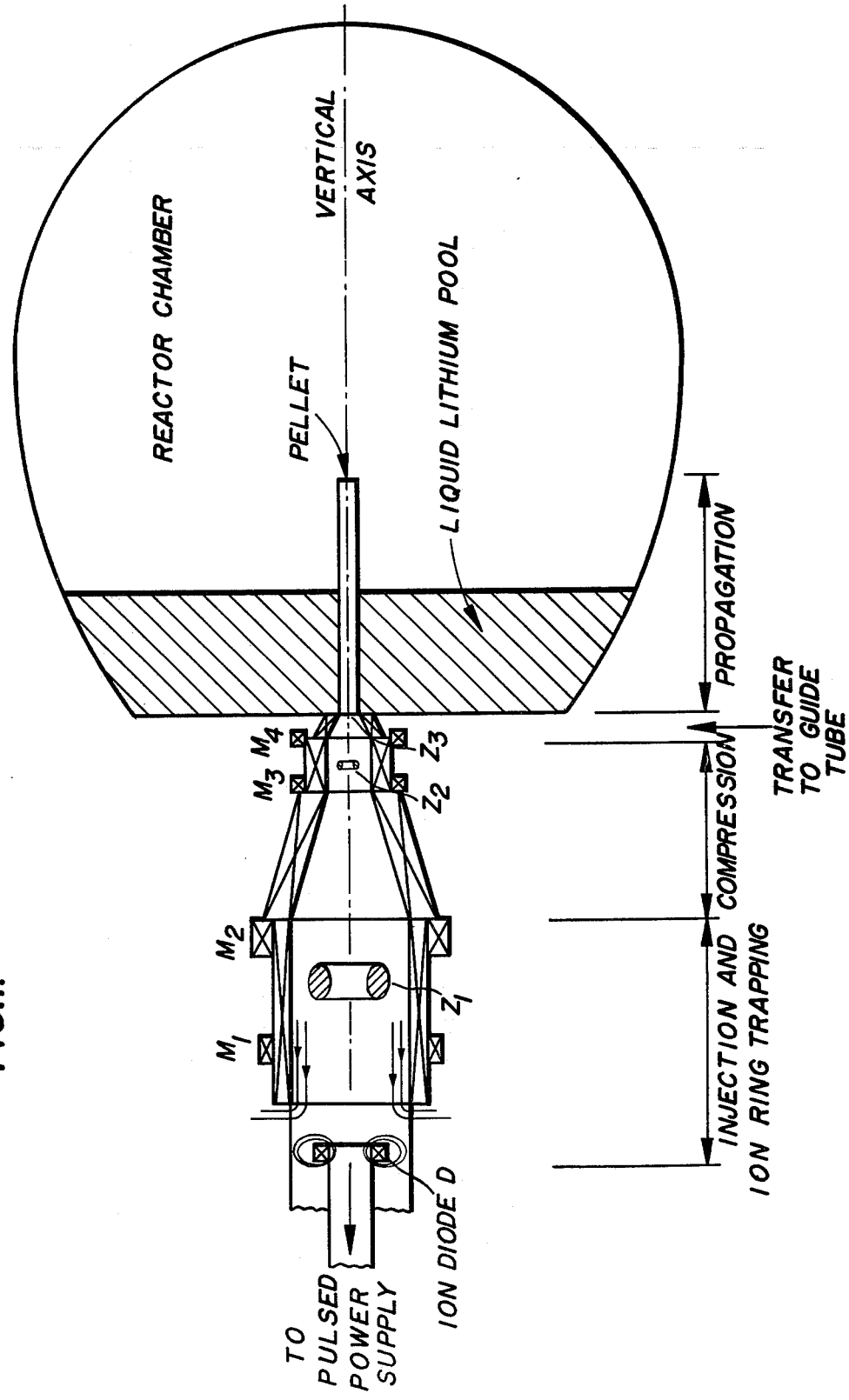
FIG. 1 is a schematic diagram of an ion ring pellet fusion reactor constructed in accordance with the principles of the invention.

Referring now to FIG. 1, the pulsed ion diode is preferably of the magnetically insulated annular ring type such as that described by Dreike, et al:

P. Dreike and R. N. Sudan, Bull. Am. Phys. Soc. 22, 1069 (1977).

Humphries et al:

S. Humphries, C. Eichenberger, and R. N. Sudan, J. Appl. Phys. 48, 2738 (1977)

demonstrated that (i) intense ion beams are charge neutralized by electron flow along field lines; (ii) such electrons are created at nearby boundary surfaces; (iii) charge neutralized intense ion beams propagate across the field in ballistic cyclotron orbits; and (iv) magnetic neutralization of the circulating ion current by azimithally drifting electrons does not take place because the radial electric field required from this drift is shorted out by electron flow along field lines. The rotating beam is trapped between mirrors $M_1$ and $M_2$ because of axial momentum loss by dissipation induced in surrounding structures. See for example:

Progress in Nuclear Energy, "Plasma Phys. and Cont. Thermonuclear Res.", N. C. Christofilos, Editors, C. Longmire, J. Tuck and W. Thompson, Pergamon Press, Vol. I, p. 576 (1962); D. W. Hudgings et al, Phys. Rev. Lett. 40, 764 (1978); A. Friedman et al., Plasma Phys. 19, 1101 (1977); A. Mankofsky, R. N. Sudan, and J. Denavit, Bull, Am. Phys. Soc. 22, 1069 (1977).

Magnetic compression of the trapped ring is achieved in two stages. The first stage utilizes superconducting coils that generate a spatially increasing field from 10–20 kG to approximately 100 kG. However, pulsed coils are required to transport the ion ring to regions of high magnetic field. The second stage employs a pulsed system to increase the field to between 0.1 to 1 MG.

In one embodiment of this invention the reactor is of the type described by Sudan et al:

R. N. Sudan and E. Ott, Phys. Rev. Lett. 33, 355 (1974) and employs the LINUS scheme:

A. E. Robson and P. J. Turchi, "The NRL LINUS Program",

Proc. Third Topical Conf. on Pulsed Highh Beta Plasmas, Culham, England, Sept. 1975, which depends upon an imploding, rotating, liquid lithium liner to compress magnetic flux and also to absorb the products of nuclear fusion. For sufficiently high gain (Q) pellets it may not be necessary to recover the expansion energy of the lithium liner which in any case is Rayleigh-Taylor unstable during this phase. Furthermore, the LINUS system in this application would be much smaller in power and energy requirements than a system for magnetic confinement of the reacting plasma.

An alternate reactor configuration (shown in FIG. 1) is to propagate the compressed ring to the pellet by opening mirror $M_4$. The outward radial expansion of the ring due to the decrease of the axial field is prevented by making the wall radius decrease with axial distance in such a manner that the image currents at the wall provide the radial ring equilibrium. As the ring moves across field lines, electrons on open field lines flow readily to the wall while new electrons flow towards the ring to maintain space charge neutralization. The pellet in FIG. 1 is located at the end of a guide tube fabricated out of solid lithium which protrudes some distance above a pool of lithium on the floor of a lithium-fall type of reactor chamber. Presumably the guide tube is destroyed in each shot, becomes part of the lithium pool and a new tube is inserted by appropriate machinery. This scheme has the advantage that the ring propagates in vacuum while any ambient environment suitable for reactor operation can be maintained in the chamber. Furthermore, a single ion ring can be designed to have enough energy for pellet ignition so that the synchronous firing of many beams is not required.

We now give some quantitative estimates of the energy, and power density that can be delivered to the pellet in this scheme.

Ion Source

For a magnetically insulated ion diode with a plasma anode emitting space-charge-limited ion current we can easily establish that the number of ions N produced is $$N = 7.23 \times 10^{18} (\eta K_1 \rho_1 / K_2^2) A^{\frac{1}{2}} (V/Z)^{3/2} \tau \qquad (1)$$

where $K_1=1-5$ is an enhancement factor over the Child-Langmuir current discussed by Sudan et al and Antonsen et al:

R. N. Sudan and R. V. Lovelace, Phys. Rev. Lett, 31, 1174 (1973); T. M. Antonsen and E. Ott, Phys. Fluids 19, 52, (1976) where $K_2 \sim 2$ is the factor by which the magnetic field has to be above the critical field for electron turn around, $\rho_1 = r_1/R_1$ is the inverse aspect ratio of the ring at $z_1$ (FIG. 1), the anode emitting area $\sim 4\pi\rho_1 R_1^2$ approximates the ring dimensions, $\eta$ is the trapping efficiency, Ze and A are the charge and atomic mass numbers of the ion, V is the diode voltage in megavolts, and $\tau$ is the pulse time in microseconds.

Ion Ring Compression

The adiabatic compression of charge neutralized ion rings has been treated by Sudan and Ott (1974), noted above and later by Weibel:

E. Weibel, Phys. Fluids 20, 1195 (1977)

who employed a Lagrangian formalism for including the self-fields and more recently by Lovelace:

R. V. Lovelace, "Kinetic Theory of Ion Ring Compression", Laboratory of Plasma Studies, Cornell University, Ithaca, NY. (1978)

using the Vlasov equation. The conservation of cononical angular momentum furnishes:

$$R^2 \Omega \left[ 1 + \frac{Nr_i}{\pi R} (\ln(R/a) - \tfrac{1}{2}) \right] - \tfrac{1}{2}\omega_c R^2 = P_\theta \equiv \text{const.} \quad (2)$$

where N is the number of ions in the ring of major radius R and minor radius r, $a = r/\nu(\ln\nu = \ln 8 - 5/4)$, $\omega_c = qB/mc$, B is the external field, $q = Ze$, $r_i = q^2/mc^2$ the classical ion radius, and $\Omega$ is the rotational frequency of the ions. The radial force balance of the ring leads to $$\omega_c = \Omega\left(1 + \frac{Nr_i}{2\pi R} \ln(R/a)\right). \quad (3)$$

The balance of ring thermal pressure and the self-pinching magnetic force leads to, $$Ia = (Nq\Omega/2\pi c)a = \text{const.}, \quad (4)$$

where it has been assumed that the two dimensional poloidal compression of the ring is governed by an adiabatic exponent $\Xi = 2$. The total ring energy W consists of the kinetic energy of rotation, $W_r = \tfrac{1}{2}NmR^2\Omega^2$, the thermal energy $W_t = NkT$, and the self-magnetic energy $W_m = \tfrac{1}{2}LI^2$ where L is the ring inductance. It is straight-forward to show from Eqs. (2), (3) and (4) that, $$\frac{W}{B} \equiv \frac{1}{2} \frac{q}{c} R^2\Omega \frac{[1 + (Nr_i/\pi R)\ln(R/a)]}{[1 + (Nr_i/2\pi R)\ln(R/a)]}, \quad (5a)$$

$$W_m/W_r \simeq 1 + (Nr_i/\pi R)\ln R/a \text{ and } W_t/W_r \simeq Nr_i/2\pi R. \quad (5b)$$

For weak rings $(Nr_i/2\pi)\ln(R/a) << 1$, and we note that $W_c \simeq \Omega$, and $R_2/a$, $R_2\Omega$ and W/B are approximately constant. For strong rings $(Nr_i/2\pi)\ln(R/a) >> 1$ we obtain $(R\Omega \ln(R\Omega/a_0\Omega_o) \simeq \text{const.}$, $(R/a) \ln, (R/a) \simeq \text{const.}$, $(R/a) \ln(R/a) \simeq \text{const.}$, and $W \propto \Omega$.

Transfer of Ring to Field Free Guide Tube

After the ring is fully compressed, the mirror field $M_4$ is switched off. Let us assume that the ring is adiabatically transferred by a set of pulsed coils from $z_2$ to $z_3$ where the external field is negligible but the confining conducting walls come much closer to the ring. The radial force balance at $z_3$ where B O is given by $$\frac{Nm}{2\pi} \Omega^2 = \frac{I^2}{-4\pi R} \frac{dL_3}{dR} \quad (6)$$

where the ring inductance at $z_3$ is approximated by $L_3 \simeq 8\pi R \ln(b/a)$ where $b = a(R_w - R)$, $\ln a = \ln 2 + \tfrac{1}{8}$ and $R_w$ is the wall radius. From (6) we obtain $$b = \frac{Nr_i}{\pi}\left(1 - \frac{b}{R}\ln b/a\right)$$

The conservation of angular momentum and total energy lead to $$R_2^2\Omega_2 \left[1 + \frac{Nr_i}{\pi R_2}(\ln(R_2/a_2) - \tfrac{1}{2})\right] - \tfrac{1}{2}\omega_{c2}R_2^2 = \quad (8)$$
$$R_3^2\Omega_3\left[1 + \frac{Nr_i}{\pi R_3}\ln(b_3/a_3)\right]$$

and $$V_{z2}^2 + R_2^2\Omega_2^2\left[1 + \frac{Nr_i}{\pi R_2}\ln(R_2/a_2)\right] = \quad (9)$$
$$V_{z3}^2 + R_3^2\Omega_3^2\left[1 + \frac{Nr_i}{\pi R_3}\ln(b_3/a_3)\right]$$

where $V_{z2}$ is any axial velocity imparted to the ring by the pulsed coils. For $R_2 \simeq R_3$ we obtain from (8) and (3)

$$\Omega_3 = \tfrac{1}{2}\Omega_2[1 + (3Nr_i/2\pi R_2)\ln(R_2/a_2)]/[1 + (Nr_i/\pi R_2)\ln(b_2/a_2)] \quad (10)$$

From Eqs. (1) and (7) we observe that $a_3$ increases over $a_2$.

Resistive Wall Losses During Ring Propagation

Because of the close proximity of the ring to the walls of the guide tube during the propagation phase, resistive losses from the image currents are to be expected. A simple calculation which assumes that the image currents flow in a skin depth in the wall leads to $$W_L = 7.0 \times 10^{-4}(R_W/\alpha R)(\rho/\alpha R V_z)^{\tfrac{1}{2}}\lambda^2 I^2 \text{ J/cm.} \quad (11)$$

where I is the ring current in amperes, $R_W$ is the tube radius in cm, $\rho$ is the wall resistivity in ohm-cm, $\lambda$ is of order $\ln(b/a)$, $V_z$ is in cm/sec; $\alpha R$ is the axial extension of the image currents with $\alpha \sim 1$. The pressure on the guide tube wall in the neighborhood of the ring is $\propto I^2$ and indeed this may be of the order of $B^2/8\pi$ where B is the compressed value of the field at $z_2$ (FIG. 1). This pressure may exceed the bursting strength of the lithium guide tube. Therefore, the ring axial velocity $V_z$ must exceed the sound velocity in lithium in order that the mechanical failure of the tube occurs after the ring has impacted the pellet. The ring axial velocity is adjustable by choosing $R_3/R_2$. Thus the ring is confined "inertially" during the propagation phase through the tube.

Ring-Pellet Interaction

Since the particle thermal velocity $V_T$ can be greater than the $\theta$-velocity $V_\theta = R\Omega$ for the compressed ion ring, a dueterium tritium pellet of radius $r_p$ smaller than the ring minor radius r will be uniformly illuminated by the ions. The characteristic time for energy delivery is estimated to be $\tau_E^{-1} \simeq (r_p^2/2\pi Ra^2) V_T$, and the terminal axial ring velocity $V_z$ should be such that $V_z\tau_E < r_p$. There will be no build-up of space charge at the pellet because the ion ring is charge neutralized by the background electrons. However, as the ions are lost to the pellet an induction electric field builds up to maintain the magnetic flux which accelerates the remaining ions. Making the reasonable assumption that the particle mechanical momentum is adsorbed by the pellet but the electromagnetic momentum is shared by the remaining ions, we obtain $\tau_c(V_\theta)^{-1} dv_\theta/dt = 2(Nr_i/\pi R)\ln(R/a)/[1 + (Nr_i/\pi R)\ln R/a] \simeq 2$ during most of ring-pellet interaction phase because $(Nr_i/\pi R)\ln(R/a) > 1$. Thus the e-folding time for $V_\theta$ is around $\tau_E$ and since $V_T > V_\theta$ initially, our previous estimate for $\tau_E$ is still reasonable. There will, however, be an increase with time in the power delivered to the pellet and the effective ion kinetic energy $E_{eff}$ during pellet interaction can be approximated by W/N.

Table I gives a sample calculation for $\alpha$-particles. The range for 30 MeV $\alpha$ particles is $\sim 0.14$ g, and for a 3 mm radius pellet at 20 MJ/g we need about 2.3 MJ. The energy delivery time is $\tau_E \simeq 20$ nsec and the wall loss $W_L \sim > 100$ kJ/m. The figures in Table I show that a reasonable case could be made for ion rings as a technique for energy compression and propagation to the pellet target. Heavier ions can also be employed but they must be highly stripped so that Z/A is not much smaller than for $\alpha$ particles.

TABLE I

|  | Initial State | Compressed State |
|---|---|---|
| Number of $\alpha$ particles N | $6 \times 10^{17}$ | $6 \times 10^{17}$ |
| Magnetic Field B | 18.33 kG | 0.66 MG |
| Total Ring Energy W | 30.2 kJ | $\sim 3.0$ MJ |
| Effective Ion Energy W/N | 3.15 MeV | 30 MeV |
| Major Radius R | 18 cm | 3 cm |
| Minor Radius r | 4.1 cm | 0.6 cm |
| Circulating frequency | $3.2 \times 10^7$ rad/sec | $0.26 \times 10^9$ rad/sec |
| Mean $\theta$-velocity R | $0.58 \times 10^9$ cm/sec | $0.78 \times 10^9$ cm/sec |
| Thermal velocity $V_T$ | $0.52 \times 10^9$ cm/sec | $1.53 \times 10^9$ cm/sec |

I claim:

1. In a system comprising means for extracting useful energy in a controlled manner from a target imploded by an energy beam, said target giving off useful energy in a controlled manner when imploded by said beam,
   a reactor chamber;
   a target fuel pellet mounted within said reactor chamber;
   means for producing an annular ring of ions;
   means to compress said ring of ions to increase its energy and decrease its size; and
   means including a guide tube for transporting said ring of ions to impact said target pellet within said reactor chamber for the purpose of initiating a fusion reaction in the pellet by energy transfer from said ions to said pellet.

2. The reactor of claim 1, wherein said reactor chamber is a lithium fall chamber and said guide tube is lithium.

3. The reactor of claim 1 wherein said means for producing an annular ring of ions is a magnetically insulated ion diode with a plasma anode.

4. A method for extracting useful energy in a controlled manner from a target imploded by an ion beam, said target giving off useful energy in a controlled manner when imploded by said ion beam, comprising:
   producing an intense, charge neutralized, ion beam pulse;
   injecting said ion beam pulse into a magnetic mirror;
   forming said ion beam into a rotating ion ring and trapping said ring in said mirror;
   magnetically compressing said trapped ion ring by transporting said ring through a spacially increasing magnetic field to increase ring energy and reduce its dimensions; and
   releasing said ion ring into a guide tube to propogate the ion ring along the tube and into contact with said target, said ion ring having sufficient energy upon impact to cause implosion of said target.

5. The method of claim 4, wherein said ion ring is magnetically compressed by generating a first spacially increasing magnetic field which increases from about 10 kG to about 100 kG, and generating a second spacially increasing magnetic field which increases from about 100 kG to about 1000 kG.

6. The method of claim 5, wherein said second magnetic field is a pulsed field, the pulsing of said second field transporting said ion ring.

7. The method of claim 4, further including compressing said ion ring by releasing said ion ring through a guide means having a wall radius which decreases with axial distance.

8. The method of claim 4, wherein said ion ring is propogated along said guide tube at a velocity exceeding the velocity of sound in the guide tube material, whereby said ion ring is confined inertially by said guide tube.

9. The method of claim 8, wherein said ion ring is compressed to a minor radius which is greater than the largest radius of said target, whereby said target is uniformly illuminated by the ions in said ring.

10. In a system for extracting useful energy in a controlled manner from a target imploded by an ion beam, said target giving off useful energy in a controlled manner when imploded by said ion beam, apparatus for generating a high energy ion ring and propogating said ring for impact on a target fusion pellet in a reaction chamber, comprising:
    a pulsed ion diode of the magnetically insulated annular ring type for generating an intense ion beam;
    means for charge neutralizing said beam;
    first magnetic field generating means causing the ions in said ion beam to propogate in ballistic cyclotron orbits to form a rotating ring of ions trapped by said first magnetic field;
    second magnetic field generating means for magnetically compressing said rotating ring; and
    means for releasing said rotating compressed ion ring and propogating the ring toward said target, said last named means including a guide tube for directing said ring to said target.

11. The apparatus of claim 10, wherein said second magnetic field generating means includes a first stage having coils for producing a first spacially increasing field and a second stage having coils for producing a second spacially increasing field, said second stage being pulsed to transport said ion ring therethrough.

12. The apparatus of claim 11, wherein said first magnetic field generating means includes a first pair of mirror coils for trapping said ion ring.

13. The apparatus of claim 12, wherein said means for releasing said compressed ion ring comprises a second pair of mirror coils axially aligned with said first pair of mirror coils and with said guide tube.

14. The apparatus of claim 12, wherein the reaction chamber is of the lithium fall type, and wherein said guide tube is of solid lithium.

* * * * *

UNITED STATES PATENT AND TRADEMARK OFFICE
CERTIFICATE OF CORRECTION

PATENT NO. : 4,290,848                          Page 1 of 2

DATED : September 22, 1981

INVENTOR(S) : Ravindra N. Sudan

It is certified that error appears in the above—identified patent and that said Letters Patent are hereby corrected as shown below:

Col. 1, line 21, change "Sumphries" to --Humphries--.
Col. 3, line 61, change "$W_c$" to --$\omega_c$--;
        line 61, each occurrence change "$R_2$" to --$R^2$--;
        line 63, change "ln, (R/a)" to --ln(R/a)--.
Col. 4, line 4, change "BO" to --$B_{\otimes}$O--;

line 48, equation 11, the units designation "J/cm" should be spaced from the equation.

Col. 5, line 14, change "dvθ/dt" to --dVθ/dt--;

line 14, change "ln(-" to --ln( --.

Col. 6, line 10, change "propogate" to --propagate--;
        line 16, change "spacially" to --spatially--;
        line 28, change "propogated" to --propagated--;
        line 40, change "propogating" to --propagating--;
        line 47, change "propogate" to --propagate--;

UNITED STATES PATENT AND TRADEMARK OFFICE
CERTIFICATE OF CORRECTION

PATENT NO. : 4,290,848
DATED : September 22, 1981
INVENTOR(S) : Ravindra N. Sudan It is certified that error appears in the above—identified patent and that said Letters Patent are hereby corrected as shown below:

Col. 6., line 53, change "propogating" to --propagating--;
line 58, change "spacially" to --spatially--.

Signed and Sealed this

Twenty-third Day of March 1982

[SEAL]

Attest:

GERALD J. MOSSINGHOFF

Attesting Officer          Commissioner of Patents and Trademarks